United States Patent [19]

Takahashi

[11] Patent Number: 4,755,902
[45] Date of Patent: Jul. 5, 1988

[54] ELECTRONIC APPARATUS WITH DETACHABLE MEMBER ARRANGED TO DETECT ERRONEOUS MOUNTING OF THE DETACHABLE MEMBER

[75] Inventor: Hiroshi Takahashi, Yokohama, Japan

[73] Assignee: Canon Kabushiki Kaisha, Tokyo, Japan

[21] Appl. No.: 894,488

[22] Filed: Aug. 11, 1986

Related U.S. Application Data

[63] Continuation of Ser. No. 574,127, Jan. 26, 1984, abandoned.

[30] Foreign Application Priority Data

Jan. 31, 1983 [JP] Japan .................................. 58-14226

[51] Int. Cl.$^4$ .............................................. H02H 7/20
[52] U.S. Cl. .......................................... 361/1; 307/85;
307/140; 361/413; 364/184; 365/226
[58] Field of Search ................... 361/1, 413; 323/371;
307/38, 85, 140, 253, 296 R; 340/693; 365/226;
364/184; 235/492

[56] References Cited

U.S. PATENT DOCUMENTS

| | | | |
|---|---|---|---|
| 3,259,754 | 7/1966 | Matheson | 307/85 |
| 3,859,635 | 1/1975 | Watson et al. | 340/172.5 |
| 4,393,432 | 7/1983 | Neuhaus et al. | 307/127 |
| 4,398,098 | 8/1983 | Minchey | 307/140 |
| 4,459,679 | 7/1984 | Sukeda et al. | 365/1 |

FOREIGN PATENT DOCUMENTS

| | | | |
|---|---|---|---|
| 1124568 | 3/1962 | Fed. Rep. of Germany | 361/413 |
| 49036 | 4/1979 | Japan | 365/226 |
| 118078 | 7/1983 | Japan | 323/318 |

OTHER PUBLICATIONS

Tillotson, "Power Supply Interlock Circuit", IBM Tech. Discl. Bul., vol. 20, No. 9, p. 3646, Feb. 1978.

Primary Examiner—William W. Beha, Jr.
Attorney, Agent, or Firm—Fitzpatrick, Cella, Harper & Scinto

[57] ABSTRACT

An electronic apparatus adapted to be used with a detachable member, such as a memory pack. The apparatus includes a pair of terminals arranged in the electronic apparatus for detecting an incorrect connection of the electronic apparatus with the memory pack. Also provided is a transistor connected to the terminals for disabling a power supply of the electronic apparatus in response to the terminals detecting an incorrect connection between the memory pack and the electronic apparatus.

15 Claims, 2 Drawing Sheets

POWER SUPPLY WITH DISABLING SWITCH

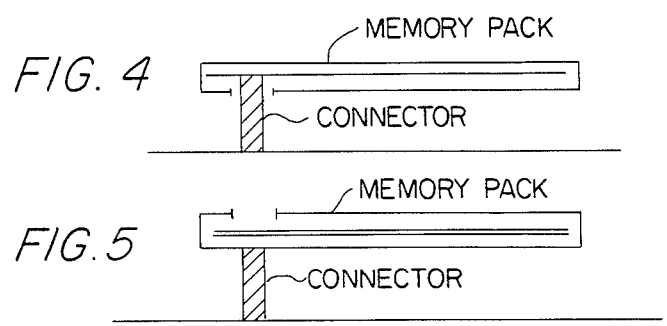

ELECTRONIC APPARATUS WITH DETACHABLE MEMBER ARRANGED TO DETECT ERRONEOUS MOUNTING OF THE DETACHABLE MEMBER

This application is a continuation of application Ser. No. 574,127 filed Jan. 26, 1984, now abandoned.

BACKGROUND OF THE INVENTION

1. Field of the Invention

The present invention relates to a method of power supply, and more particularly to such method wherein a part of a connector is formed as power supply control elements to interrupt the power supply in case of an erroneous connection of the connector.

2. Description of the Prior Art

A memory pack in which a memory module or the like is enclosed in a metal or conductive case for mechanical reinforcement and noise shielding, the case having an aperture installing a connector is known in the art. Such a memory pack, if erroneously mounted, may cause short-circuiting of the contacts of the connector which are connected to a main apparatus by the metal case of the metal pack, thus eventually damaging the circuits in the main apparatus.

SUMMARY OF THE INVENTION

In consideration of the foregoing, an object for supplying the present invention is to provide a method of power wherein designated connector contacts are formed as power supply control elements thereby interrupting the supply of power if the connector is mounted incorrectly.

Another object of the present invention is to provide a detachable member and an electronic apparatus utilizing such detachable member, comprising means for detecting erroneous mounting of the detachable member on the electronic apparatus, and means for disabling selected functions of the electronic apparatus in response to the detection of incorrect mounting by the detecting means.

Still another object of the present invention is to provide an electronic apparatus with a detachable member, comprising control means provided on the detachable member for controlling the power supply of the electronic apparatus, and means for activating said power supply by the control means.

Still another object of the present invention is to provide an electronic apparatus with a detachable member, comprising means for detecting erroneous mounting of the detachable member, and means for disabling the function of the electronic apparatus in response to the detection by the detecting means, wherein the disabling means comprises means for activating the electronic apparatus while the detachable member is detached from the electronic apparatus.

BRIEF DESCRIPTION OF THE DRAWINGS

FIGS. 4 and 5 are schematic sectional views of the proper and improper connection, respectively, between the metal case housing the memory pack and the connector element of the present invention.

DESCRIPTION OF THE PREFERRED EMBODIMENTS

Figure 1:
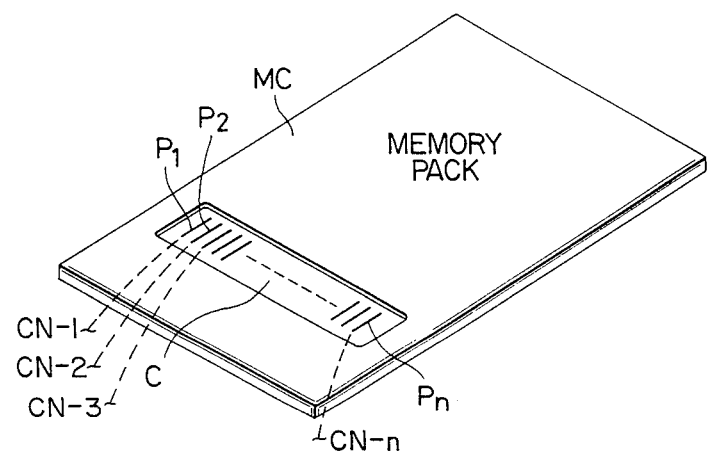
FIG. 1 is an external perspective view of a memory pack.

The present invention is described in greater detail by an embodiment thereof shown in the attached drawings. FIG. 1 is a perspective view showing a memory pack, wherein a memory pack MC having a metal case encloses a memory element such as a read-only memory or a random access memory mounted on a printed circuit board, and an aperture C of the case is provided with contacts P1, P2–Pn for signal exchange with an electronic apparatus. Among the contacts, the contacts P1 and P2 are electrically insulated.

Figure 2:
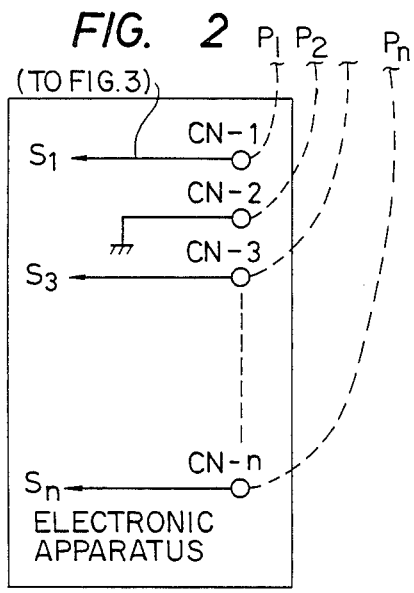
FIG. 2 is a schematic view showing the structure of a connector on the electronic apparatus.

FIG. 2 shows a connector to be provided on the electronic apparatus corresponding to the contacts of memory pack MC, wherein pins CN-1, CN-2–CN-n respectively correspond to and are brought into contact with the contacts P1, P2–Pn when memory pack MC is correctly mounted on the electronic apparatus. Among these pins, the pins CN3–CNn are used for making access to the memory in memory pack MC and supplying power to memory pack MC. Pins CN1 and CN2 are used for detecting whether memory pack MC is correctly mounted on the electronic apparatus. Pin CN2 is grounded in the circuit of the electronic apparatus while pin CN1 is maintained open. When pins CN1 and CN2 are shortcircuited as illustrated in FIG. 5, a signal line S1 connected to pin CN1 is grounded to control a power supply control circuit thereby interrupting the power supply in the circuit of the electronic apparatus.

Figure 3:
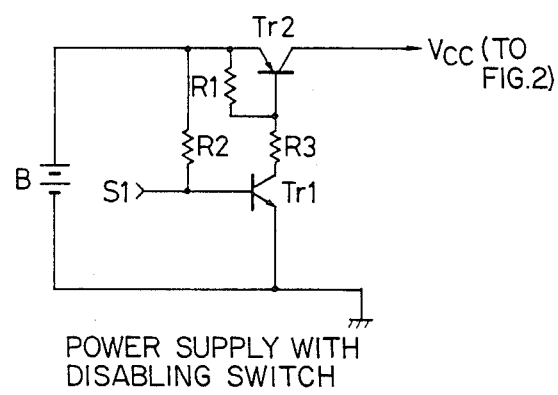
FIG. 3 is a circuit diagram showing a power supply control circuit.

FIG. 3 shows a power supply control circuit wherein a battery B supplies electric power to the circuit of the electronic apparatus through a transistor Tr2. When a transistor Tr1 is rendered conductive, a base current flows to transistor Tr2 through a resistor R3 to supply electric power to the circuit of the electronic apparatus. When transistor Tr1 is non-conductive, transistor Tr2 is turned off to interrupt the power supply to the circuit of the electronic apparatus. The conductive or non-conductive state of transistor Tr1 is determined by the potential of line S1 connected to the base. When signal line S1 is open, a base current flows to transistor Tr1 through a pull-up resistor R2 to render transistor Tr1 conductive. Transistor Tr1 is non-conductive when signal line S1 is grounded.

When memory pack MC is correctly mounted as illustrated in FIG. 4, contacts P1 and P2 are maintained in contact with connector pins CN1, CN2 of the electronic apparatus which are electrically insulated so that contact CN1 remains open. Signal line S1 remains open, so that transistor Tr1 is rendered conductive by a base current supplied through resistor R2. Thus, transistor Tr2 receives a base current through resistor R3 to supply electric power to the load from the battery B. If memory pack MC is mounted in the wrong direction, as shown in FIG. 5 pins CN1 and CN2 are short-circuited by the metal case of memory pack MC to ground the signal line S1, whereby the supply of base current to transistor Tr1 is terminated. Thus transistor Tr1 is rendered non-conductive to turn off transistor Tr2, thereby interrupting the supply of power from the battery B to the load. In this manner the electronic apparatus is protected from damage resulting from an excessive current caused by the short-circuiting of a power supply connector.

As explained in the foregoing, the present invention enables to prevent damage to a circuit resulting from short circuiting of the connector of a detachable memory. Designated connector terminals are so constructed as to detect an erroneous mounting of the connector and to interrupt the supply of power to the load.

I claim:

1. An apparatus comprising:
   an electronic apparatus comprising a circuit and further comprising detecting means on said electronic apparatus;
   a detachable member adapted to be detachably attached to said electronic apparatus, wherein said detecting means detects an incorrect connection of said detachable member to said electronic apparatus;
   a power supply for supplying power to said circuit of said electronic apparatus; and
   means connected to said detecting means for disabling said power supply from supplying power to said electronic apparatus in response to detection of an incorrect connection by said detecting means.

2. An apparatus according to claim 1, wherein said detachable member comprises an electroconductive case and a unit for connecting with said electronic apparatus, and wherein said detecting means is adapted to provide a ground connection to said disabling means indicating erroneous mounting upon contact with said conductive case and to provide a potential to said disabling means indicating correct mounting upon contact with said connecting unit.

3. An apparatus according to claim 2, wherein said electro-conductive case comprises an aperture portion for electrically connecting with said electronic apparatus.

4. An apparatus according to claim 3, wherein said detachable member comprises a lead terminal in a position corresponding to the aperture portion of said case.

5. An apparatus according to claim 1, wherein said disabling means comprises means for activating said electronic apparatus while said detachable member is either detached from or correctly connected to said electronic apparatus.

6. An apparatus according to claim 1, wherein said detachable member comprises a case and a unit for connecting with said electronic apparatus, wherein said case comprises an aperture portion, and wherein said detachable member comprises an electrode in a position corresponding to the aperture portion of said case.

7. An apparatus according to claim 1, wherein said detachable member includes a plurality of terminals and said detecting means detects the connection of said detachable member by detecting connection of said terminals.

8. An apparatus according to claim 7, wherein said detachable member includes a memory member for storing information, said memory member being connected to said plurality of terminals.

9. An apparatus comprising:
   an electronic apparatus comprising a circuit and detecting means;
   a detachable member adapted to be detachably inserted into said electronic apparatus, wherein said detecting means detects incorrect insertion of said detachable member into said electronic apparatus;
   a power supply for supplying power to said electronic apparatus; and
   means connected to said detecting means for causing said power supply to supply power to said circuit of said electronic apparatus, wherein said causing means prevents said power supply from supplying power to said detachable member when said detecting means detects an incorrect insertion of said detachable member.

10. An apparatus with a detachable member according to claim 9, wherein said detachable member includes a plurality of terminals and said detecting means detects the insertion of said detachable member by detecting insertion of said terminals.

11. An apparatus with a detachable member according to claim 10, wherein said detachable member includes a memory member for storing information, said memory member being connected to said plurality of terminals.

12. An apparatus comprising:
   an electronic apparatus comprising detecting means;
   a detachable member adapted to be detachably mounted on said electronic apparatus, wherein said detecting means detects erroneous mounting of said detachable member on said electronic apparatus;
   a power supply for supplying power to said electronic apparatus; and
   means connected to said detecting means for preventing said power supply from supplying power to said electronic apparatus.

13. An apparatus with a detachable member according to claim 12, wherein said detachable member includes a plurality of terminals and said detecting means detects the connection of said detachable member by detecting connection of said terminals.

14. An apparatus with a detachable member according to claim 13, wherein said detachable member includes a memory member for storing information, said memory member being connected to said plurality of terminals.

15. An apparatus according to claim 12, wherein said detachable member comprises an electroconductive case and a unit for being connecting to said electronic apparatus, and wherein said detecting means provides a ground connection to said disabling means indicating erroneous mounting upon contact with said electroconductive case and provides a potential to said disabling means indicating correct mounting to deactivate said disabling means and enable said electronic apparatus upon correct mounting of said electroconductive case on said electronic apparatus or upon detaching said electroconductive case from said electronic apparatus.

* * * * *

UNITED STATES PATENT AND TRADEMARK OFFICE
CERTIFICATE OF CORRECTION

PATENT NO. : 4,755,902

DATED : July 5, 1988

INVENTOR(S) : HIROSHI TAKAHASHI

It is certified that error appears in the above-identified patent and that said Letters Patent is hereby corrected as shown below:

IN THE REFERENCES [56] PRIMARY EXAMINER

COLUMN 1

Line 20, "installing" should read --for receiving--.
Line 28, "for sup-" should read --of--.
Line 29, "plying" should be deleted and "of" should read --for supplying--.
Line 62, "and" should be deleted.
Line 64 "circuit" should read --circuit. and--.

COLUMN 2

Line 20, "making" should read --providing--.
Line 27, "shortcircuited" should read --shortcircuited,--.
Line 46, "mounted" should read --mounted, --.
Line 56, "FIG. 5" should read --FIG. 5,--.
Line 67, "to prevent" should read --prevention of--.

UNITED STATES PATENT AND TRADEMARK OFFICE
CERTIFICATE OF CORRECTION

PATENT NO. : 4,755,902

DATED : July 5, 1988

INVENTOR(S) : HIROSHI TAKAHASHI

It is certified that error appears in the above-identified patent and that said Letters Patent is hereby corrected as shown below:

COLUMN 3

Line 29, "electro-conductive" should read --electroconductive--.

COLUMN 4

Line 48, "connecting" should read --connected--.

Signed and Sealed this

Twenty-fifth Day of April, 1989

Attest:

DONALD J. QUIGG

Attesting Officer

Commissioner of Patents and Trademarks